United States Patent [19]

Kohn

[11] Patent Number: 5,204,828

[45] Date of Patent: Apr. 20, 1993

[54] BUS APPARATUS HAVING HOLD REGISTERS FOR PARALLEL PROCESSING IN A MICROPROCESSOR

[75] Inventor: Leslie D. Kohn, San Jose, Calif.

[73] Assignee: Intel Corporation, Santa Clara, Calif.

[21] Appl. No.: 803,684

[22] Filed: Dec. 3, 1991

Related U.S. Application Data

[63] Continuation of Ser. No. 309,430, Feb. 10, 1989, abandoned.

[51] Int. Cl.[5] .................................................. G06F 7/38
[52] U.S. Cl. ........................................ 364/736; 364/748;
364/258; 364/258.2; 364/240.2; 364/935.46;
364/937.1; 364/937.4; 364/DIG. 2; 395/800
[58] Field of Search ................ 395/325, 800; 364/736,
364/754, 768, 748

[56] References Cited

U.S. PATENT DOCUMENTS 4,075,704  2/1978  O'Leary ........................... 364/748
4,766,564  8/1988  DeGroot .......................... 364/748

Primary Examiner—Eddie P. Chan
Attorney, Agent, or Firm—Blakely, Sokoloff, Taylor & Zafman

[57] ABSTRACT

In a microprocessor having a floating-point execution unit, a floating-point bus control apparatus for performing dual-operation instructions includes a multiplier unit having first and second multiplexed operand inputs, an adder unit also having first and second multiplexed operand inputs, a register for storing real and imaginary components of a constant, another register for storing an intermediate result of the multiplier unit and appropriate interconnections. The floating-point unit of the processor supplies first and second instruction source operands and a destination floating-point register. Multiplexers are used to select which operands are to be input to the appropriate operand inputs so as to implement the corresponding dual-operation algorithm.

6 Claims, 6 Drawing Sheets

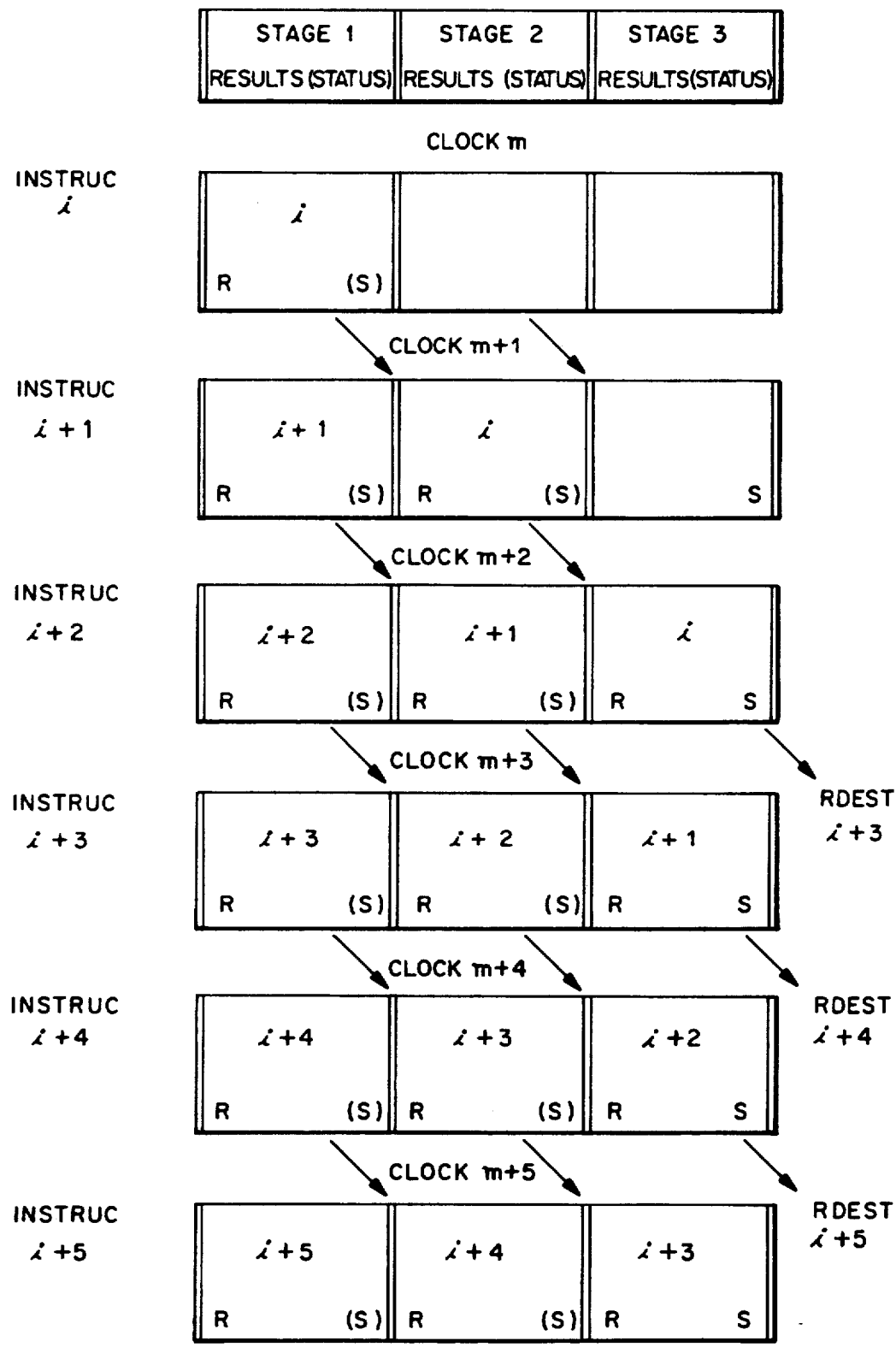
FIG_1

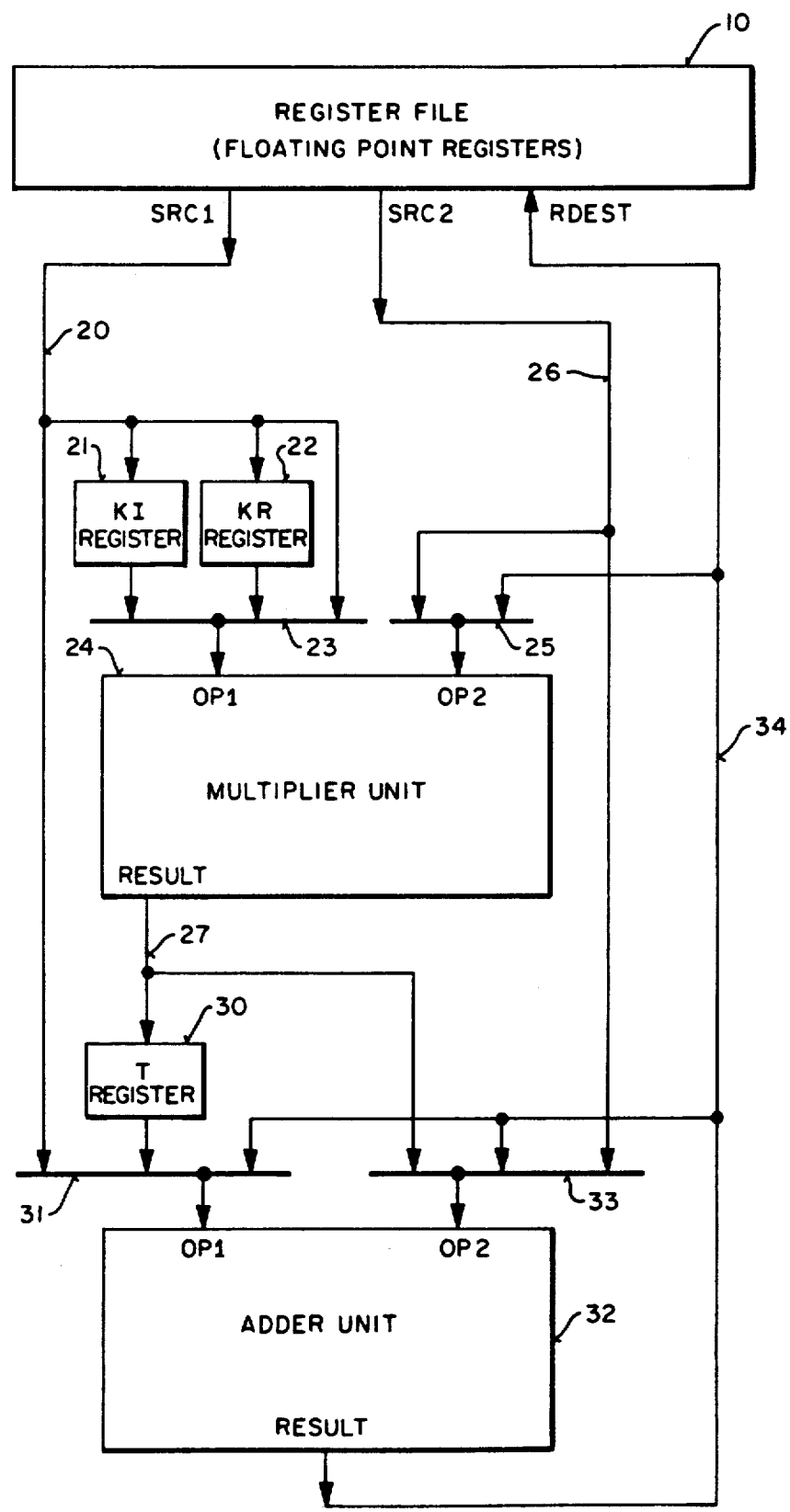

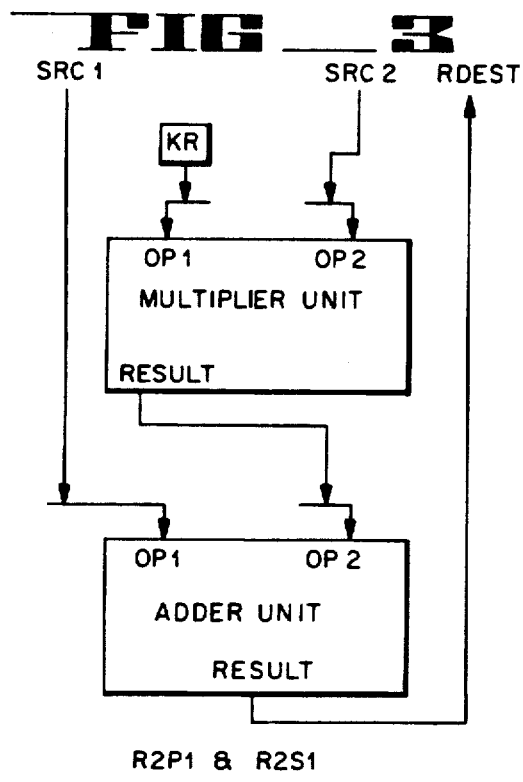
FIG_3
R2P1 & R2S1
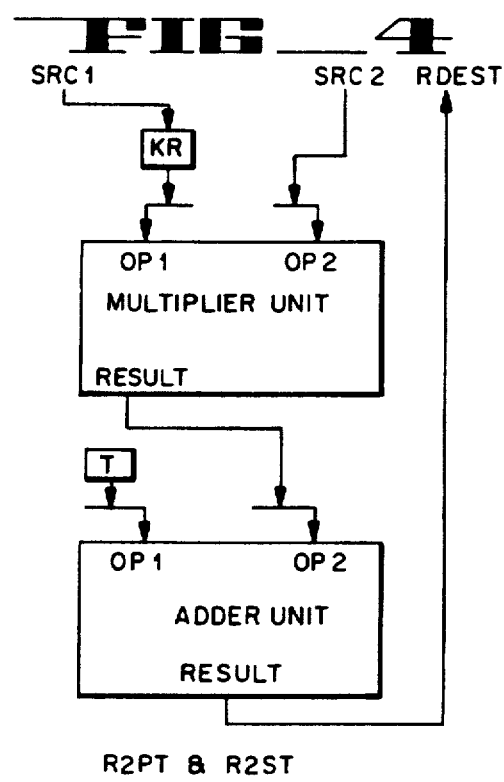
FIG_4
R2PT & R2ST
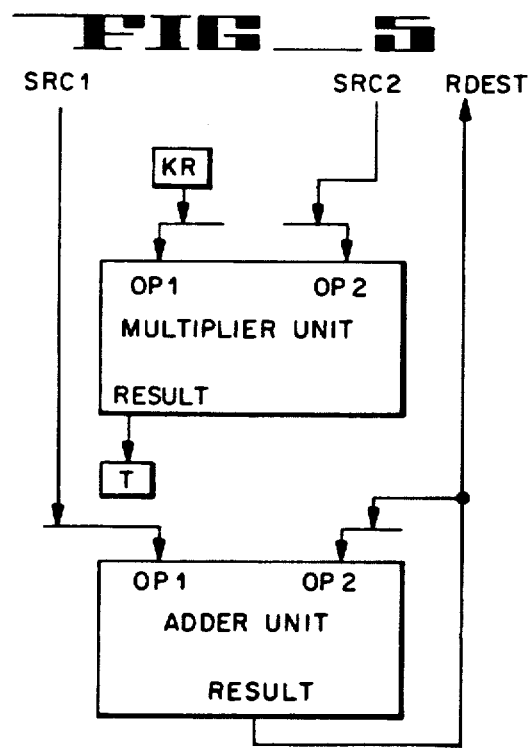
FIG_5
R2AP1 & R2AS1
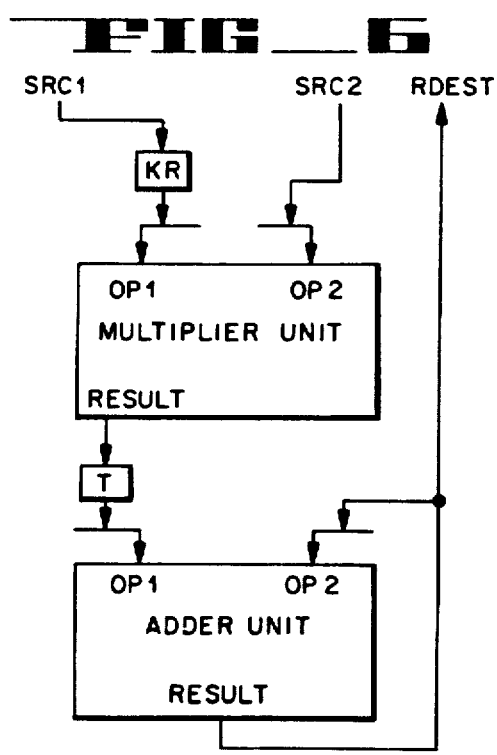
FIG_6
R2APT & R2AST

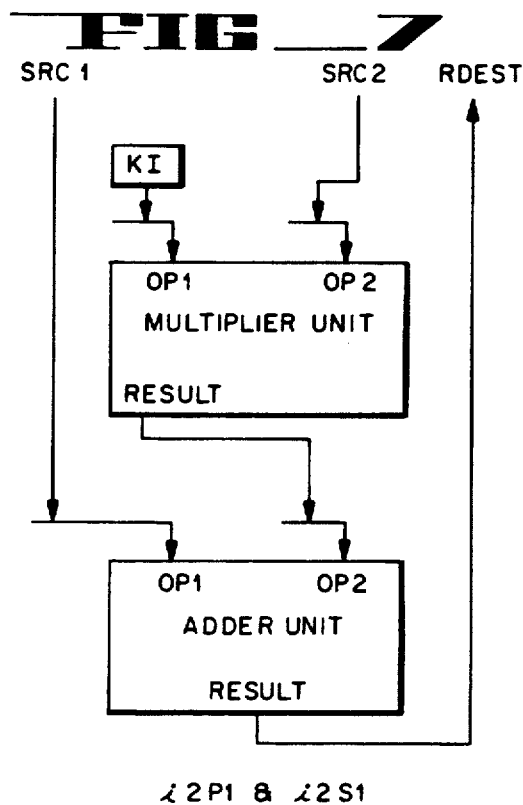
FIG_7
i2P1 & i2S1
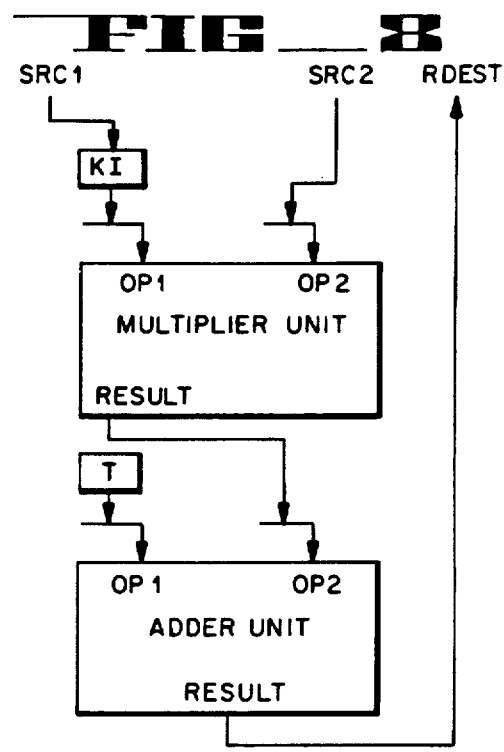
FIG_8
i2PT & i2ST
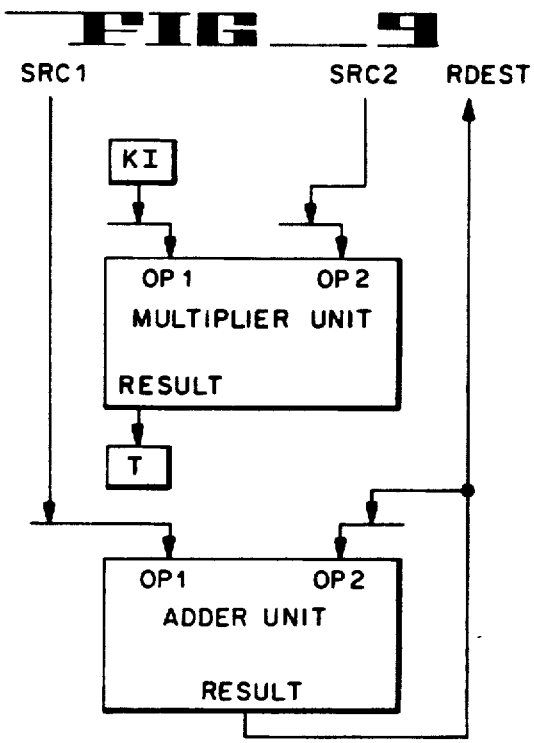
FIG_9
i2AP1 & i2AS1
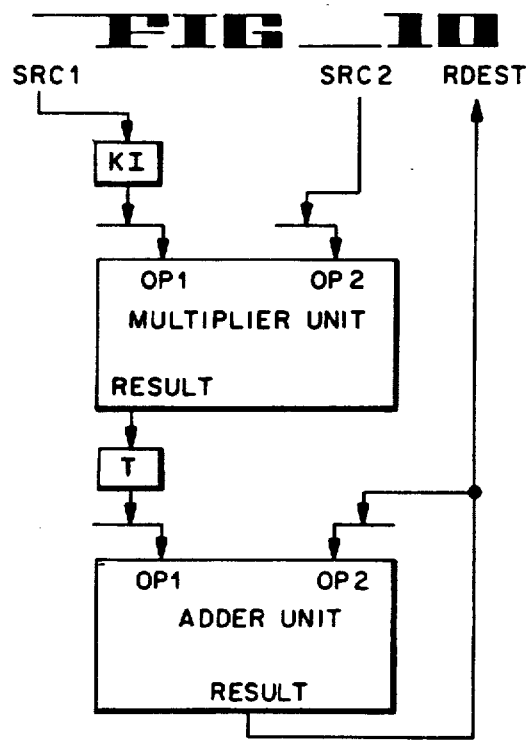
FIG_10
i2APT & i2AST

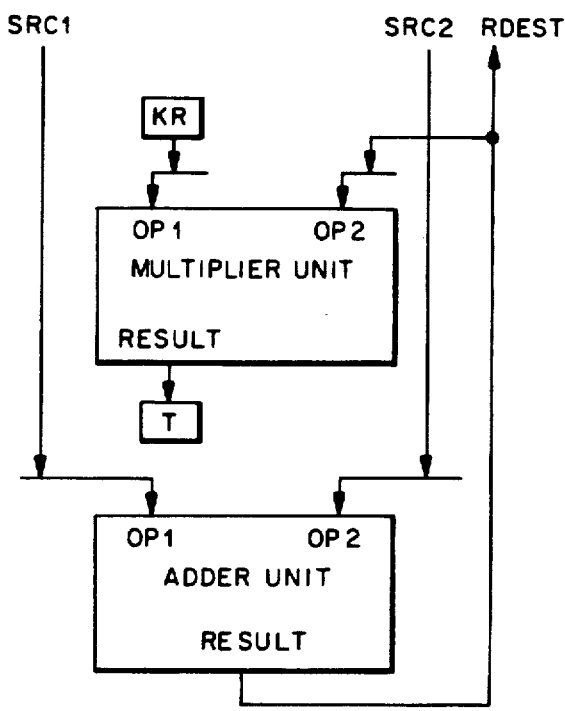
FIG_11
RAT1P2 & RAT1S2
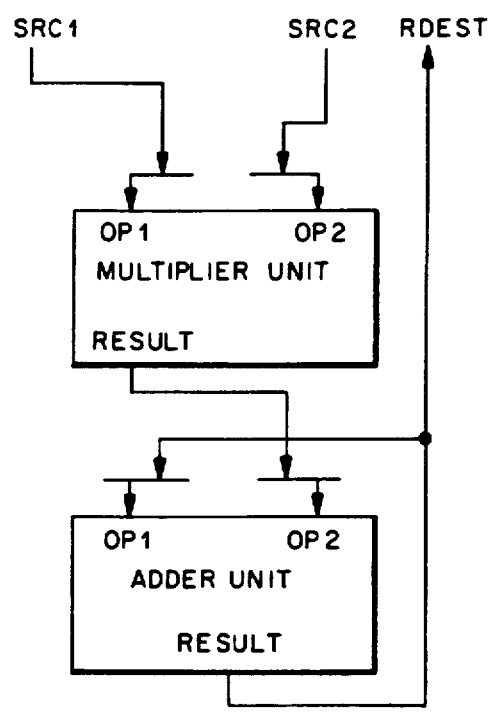
FIG_12
M12APM & M12ASM
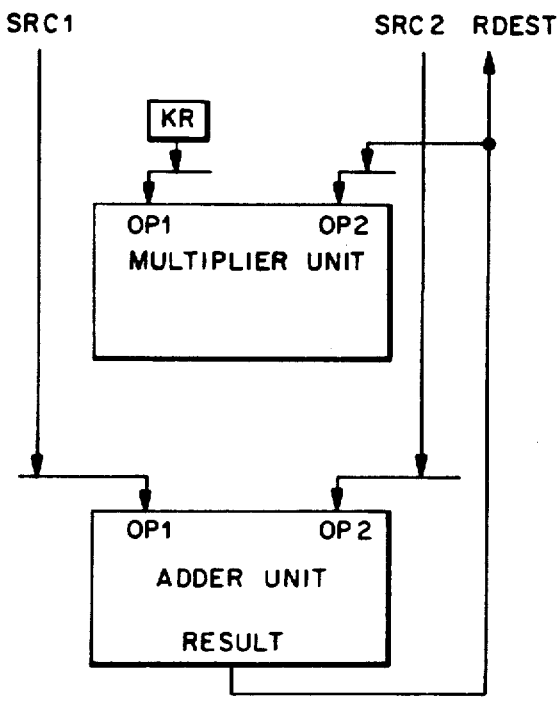
FIG_13
RA1P2 & RA1S2
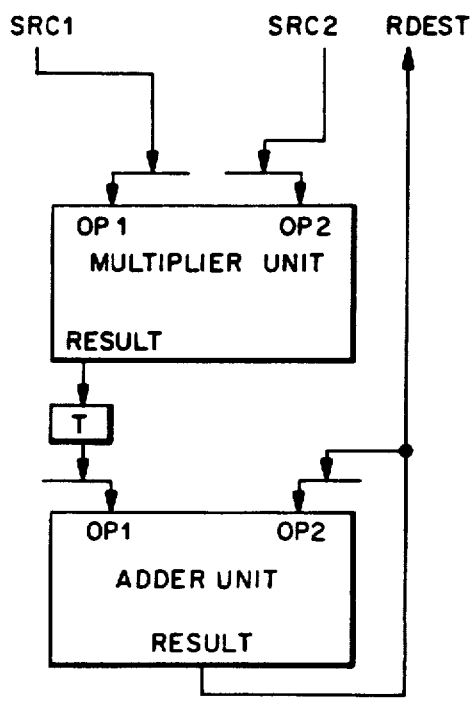
FIG_14
M12TTPA & M12TTSA

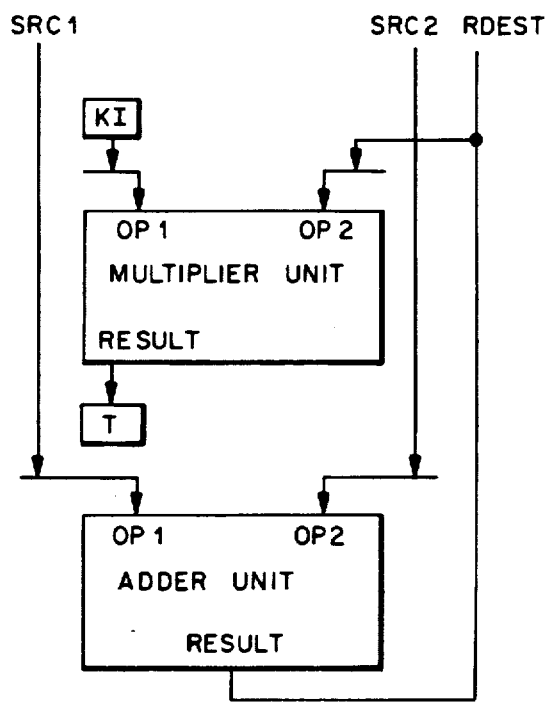
∠AT1P2 & ∠AT1S2
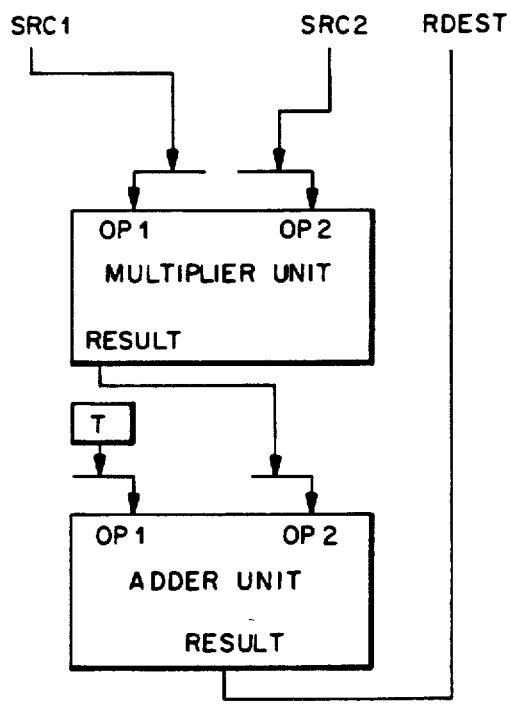
M12TPM & M12TSM
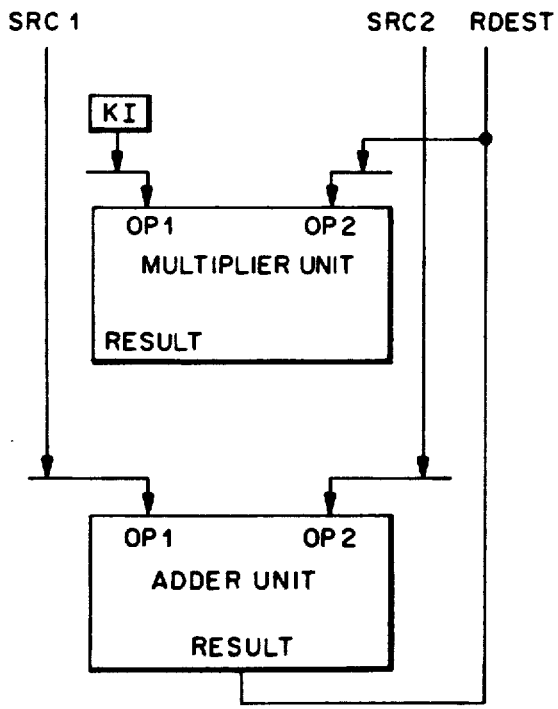
∠A1P2 & ∠A1S2
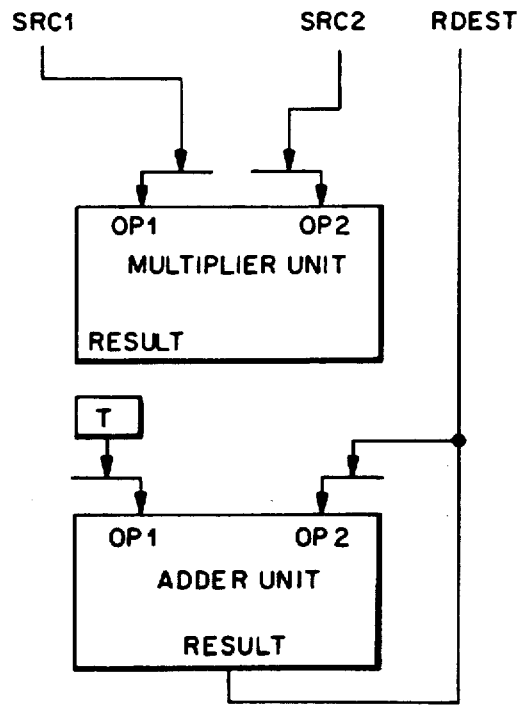
M12TPA & M12TSA

BUS APPARATUS HAVING HOLD REGISTERS FOR PARALLEL PROCESSING IN A MICROPROCESSOR

This is a continuation of application Ser. No. 07/309,430, filed Feb. 10, 1989, now abandoned.

FIELD OF THE INVENTION

The invention relates to the field of semiconductor microprocessors.

BACKGROUND OF THE INVENTION

The present invention covers a bus control apparatus arrangement forming part of a floating-point unit within a microprocessor. The microprocessor utilized with the present invention is the Intel 860 TM Microprocessor, frequently referred to as the N10 TM processor. (Intel is a registered trademark of Intel Corporation).

The N10 processor is a 32/64-bit IEEE compatible floating-point processor, a 32-bit RISC integer processor and a 64-bit 3-dimensional graphics processor. Using a numerics processor optimized for both vector and scalar operations, it represents the industry's first integrated high performance vector processor incorporating over one million transistors and providing about ½ the performance of the Cray1, all on a single chip. The N10 processor uses pipelined floating-point units to achieve extremely fast execution rates.

As will be seen, the present invention provides a highly optimized bus control apparatus for the floating-point hardware of the N10 processor. This bus control apparatus supports simultaneous (dual) operation of a multiplier and an adder unit. These dual-operations support the most commonly used software algorithms such as sum of products, DAXPY, FFT, etc.

Normally, in the instructions of a microprocessor, the source operands and destinations are specified from a set of floating-point registers. In most systems, this set of floating-point registers usually supplies two source operands and one destination operand. The three operand arrangement is sufficient for doing simple add or multiply operations. However, to perform dual-operations such as an add or multiply simultaneously, three more operands (for a total of six) need to be supplied. Because it is very inefficient to require the floating-point register file to deal with six operands, prior art microprocessors typically perform dual-operations serially. In other words, an add is first performed followed by a multiply, or vice versa.

An alternative to serial operation is to perform both multiply and add operations in parallel. One widely adopted approach is known as a multiply cumulate operation. In the multiply cumulate operation, the multiplier gets two source operands from the floating-point register file. One of the operand inputs to the adder receives the result output of the multiplier. The other source operand input to the adder is coupled to the result output of the adder itself, in a sort of feedback arrangement. The arithmetic operation simulated is basically a cumulation of the sum of products. The chief drawback of the multiply cumulate operation is that it is only capable of implementing a simple kind of operation, i.e., a sum of products. This is because the interconnects are generally "hard-wired" in a fixed arrangement. Because of the desire to implement a variety of algorithms, what is needed is an apparatus which is substantially more generalized and can handle a broader range of operations. It would be advantageous to have a bus control apparatus that could implement complex algorithms in a much more efficient manner. As will be seen, the present invention permits a broad range of parallel operations, or algorithms, to be executed in an efficient manner. This capability enhances the presently described microprocessor when compared to prior art processors.

SUMMARY OF THE INVENTION

A bus control apparatus for performing dual arithmetic operations in a microprocessor capable of executing floating-point operations is described. The microprocessor provides first and second floating-point source instruction operands and a floating-point destination register. A multiplier means is used to multiply first and second operands to produce a first result. An adder means is used for adding third and fourth operands to produce a second result. The present invention also includes a register means for storing real and imaginary portions of a constant used for performing inner loop calculations for a given algorithm, and also for temporarily storing the first result produced by the multiplier. Data path control means are used for selecting one of a plurality of operands to be coupled to each of the operand inputs of the multiplier and the adder so as to realize a predetermined algorithm in a parallel manner. This aspect of the present invention permits a wide variety of algorithms, combining both multiply and add operations in parallel, to be implemented within the microprocessor.

Finally, interconnections are provided in the bus control apparatus for connecting the plurality of operands (which may include the first result, the second result, first and second source operands, a constant or the temporarily stored first result) to the inputs of the data path control means. For a given algorithm implementation the data path control means determine which particular operand input is to be coupled to the appropriate input of either the multiplier or the adder. By way of example, sixteen different data paths implementing sixteen different software instructions, or algorithms, are shown in accordance with the teachings of the present invention.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 1 illustrates the pipelined architecture of the processor associated with the floating-point bus control apparatus of the present invention. Three pipeline stages are shown.

FIG. 2 shows a preferred embodiment of the bus control apparatus of the present invention.

FIG. 3 shows the actual data-path selected for the mnemonics r2p1 and r2s1, as given in Table 1. Each mneumonic represents a particular software instruction.

FIG. 4 shows the actual data-path selected for the mnemonics r2pt and r2st, as given in Table 1. Each mneumonic represents a particular software instruction.

FIG. 5 shows the actual data-path selected for the mnemonics r2ap1 and r2as1, as given in Table 1. Each mneumonics represents a particular software instruction.

FIG. 6 is the actual data-path selected for the mnemonics r2apt and r2ast, as given in Table 1. Each mneumonic represents a particular software instruction.

FIG. 7 is the actual data-path selected for the mnemonics i2p1 and i2s1, as given in Table 1. Each mneumonic represents a particular software instruction.

FIG. 8 is the actual data-path selected for the mnemonics i2pt and i2st, as given in Table 1. Each mneumonic represents a particular software instruction.

FIG. 9 is the actual data-path selected for the mnemonics i2ap1 and i2as1, as given in Table 1. Each mneumonic represents a particular software instruction.

FIG. 10 is the actual dual-path selected for the mnemonics i2apt and i2ast, as given in Table 1. Each mneumonic represents a particular software instruction.

FIG. 11 is the actual data-path selected for the mnemonics rat1p2and rat1s2, as shown in Table 1. Each mneumonic represents a particular software instruction.

FIG. 12 is the actual data-path selected for the mnemonics m12apm and m12asm, as given in Table 1. Each mneumonic represents a particular software instruction.

FIG. 13 is the actual data-path selected for the mnemonics ra1p2 and ra1s2, as given in Table 1. Each mneumonic represents a particular software instruction.

FIG. 14 is the actual data-path selected for the mnemonics m12ttpa and m12ttsa, as given in Table 1. Each mneumonic represents a particular software instruction.

FIG. 15 is the actual data-path selected for the mnemonics iat1p2 and iat1s2, as given in Table 1. Each mneumonic represents a particular software instruction.

FIG. 16 is the actual data-path selected for the mnemonics m12tpm and m12tsm, as given in Table 1. Each mneumonic represents a particular software instruction.

FIG. 17 is the actual data-path selected for the mnemonics ia1p2 and ia1s2, as given in Table 1.

FIG. 18 is the actual data-path selected for the mnemonics m12tpa and m12tsa, as given in Table 1. Each mneumonic represents a particular software instruction.

DETAILED DESCRIPTION OF THE INVENTION

A floating-point bus control apparatus for use in performing parallel arithmetic operations is described. In the following description, numerous specific details are set forth, such as specific data-paths, etc., in order to provide a thorough understanding of the present invention. It will be obvious, however, to one skilled in the art that these specific details need not be used to practice the present invention. In other instances, well-known structures and circuits, such as adders and multipliers, have not been shown in detail in order not to unnecessarily obscure the present invention.

In the architecture of many modern microprocessors, the floating-point unit uses parallelism to increase the rate at which operations may be introduced into the unit. One type of parallelism is called "pipelining". The pipelined architecture treats each operation as a series of more primitive operations (called "stages") that can be executed in parallel. Consider just the floating-point adder unit of a processor as an example. Let A represent the operation of the adder. Let the stages be represented by $A_1$, $A_2$, and $A_3$. The stages are designated such that $A_{i+1}$ for one adder instruction can execute in parallel with $A_i$ for the next adder instruction. Furthermore, each $A_i$ can be executed in just one clock. The pipelining within the multiplier and vector integer units of the processor can be described similarly, except that the number of stages may be different.

FIG. 1 illustrates 3-stage pipelining as found in the floating-point adder (also in the floating-point multiplier when single-precision input operands are employed) of the processor incorporating the present invention. Each column of the figures represents one of the three stages of the pipeline. Each stage holds intermediate results and also (when introduced into the first stage by software) holds status information pertaining to those results. The figure assumes that the instruction stream consists of a series of consecutive floating-point instructions, all of one type (i.e., all adder instructions, or all single-precision multiplier instructions). The temporal relationship of the instructions is represented as i, i+1, i+2, etc. The rows of the figure represent the states of the unit at successive clock cycles. Each time a pipelined operation is performed, the status of the last stage becomes available to a status register (for example, in the N10 processor, the result is available in floating-point status register "fsr"). The result of the last stage of the pipeline is stored in rdest, the pipeline is advanced one stage and the input operands src1 and src2 are transferred to the first stage of the pipeline. The mnemonics src1 and src2 and rdest refer to one of the 32 floating-point registers located within the N10 processor.

In the N10 processor, the number of pipeline stages may range from one to three. A pipelined operation with a 3-stage pipeline stores the result of the third prior operation. A pipelined operation with a 2-stage pipeline stores the result of the second prior operation. A pipelined operation with a 1-stage pipeline stores the results of the prior operation. The N10 processor has four floating-point pipelines: one for the multiplier, one for the adder, one for the vector-integer unit and one for floating-point loads. The adder pipeline has 3 stages. The number of stages in the multiplier pipeline depends on the precision of the source operands in the pipeline; either 2 or 3 stages. The vector-integer unit has 1 stage for all precisions. The load pipeline has 3 stages for all precisions.

Referring to FIG. 2, a preferred embodiment of the present invention is shown. The floating-point bus control apparatus of FIG. 2 comprises a multiplier unit 24 and an adder unit 32. The internal design of units 24 and 32 is well-known within the field and will not be discussed here. Simply stated, they may comprise any ordinary digital multiplier or adder. The currently preferred embodiment uses a multiplier unit disclosed in copending U.S. Patent applications entitled "Four-to-Two Adder Cell for Parallel Multiplication", now U.S. Pat. No. 4,901,270, issued on Feb. 13, 1990 and "Sticky bit Predictor for Floating-Point Multiplication", now U.S. Pat. No. 4,928,259, issued on May 22, 1990 both of which are assigned to the assignee of the present invention. The adder unit of the currently preferred embodiment is disclosed in co-pending U.S. Patent applications entitled "Prenormalization for a Floating-Point Adder", now U.S. Pat. No. 5,010,508, issued on Apr. 23, 1991, and "Rounding Logic for Floating-Point Adder", now U.S. Pat. No. 5,027,308, issued on Jun. 25, 1991 both of which are also assigned to the assignee of the present application.

As illustrated, the bus control apparatus also comprises three special registers: KR register 22, KI register 21 and T register 30. (KI stands for constant imaginary, KR is constant real and T stands for temporary). These registers can store values from one dual-operation instruction and supply them as inputs to subsequent dual-operation instructions. The constant registers 22 and 21 can be used for storing the real and imaginary portions, respectively, of an operand src1. Those values may then be subsequently supplied to the multiply pipeline in place of src1. The T (temporary) register 30 is useful for storing the last-stage result of the multiplier pipeline and thereafter suppling that value to the adder pipeline in place of src1.

Also shown in FIG. 2 are data-path control members 23, 25, 31 and 33. Data path control members 23, 25, 31 and 33 are used to select the operand inputs to both the multiplier unit and the adder unit. Each of these control members (shown in FIG. 2 by a single horizontal line) typically may comprise a switching device such as a multiplexer or a controllable bus. The preferred embodiment currently uses ordinary multiplexers of a variety well-known in the art.

In operation, one operand out of a plurality of operands (shown by arrows directed into the horizontal lines representing the data-path control members) is selected to be coupled into either the multiplier or adder unit. For example, data-path control member 23, provides either the constant imaginary value stored in KI, the constant real value stored in KR or the source operand src1 to the first operand input of the multiplier unit 24 depending on which algorithm is to be implemented. In the preferred embodiment, control for each of the multiplexers 23, 25, 31 and 33 is provided by a 4-bit data-path control field (DPC) in the opcode. The DPC specifies the operands and also the loading of the special registers.

FIG. 2 shows the complete bus connection matrix used to realize all the possible algorithms supported by a preferred embodiment of the present invention. Thus, operand 1 of multiplier unit 24 is selected to be either KR, supplied from register 22, KI from register 21 or src1 supplied along line 20. The determination of which one of these values becomes operand 1 (op1) of the multiplier is fixed by the particular encoding of the DPC. Similarly, operand 2 (op2) of the multiplier can either be src2, supplied from line 26, or the last stage result of the adder pipeline appearing on line 34. Control member 25 determines which of these two values becomes operand 2. Operand 1 of the adder can either be src1, connected from line 20, the temporary result value stored in T register 30, or the last stage result of the adder pipeline input along line 34. Control member 31 is used to select the appropriate data path for the operand 1 input of adder unit 32. Finally, operand 2 of adder 32 is selected to be either src2 from line 26, the last-stage result of the multiplier pipeline on line 27, or the last-stage result of the adder pipeline supplied on line 34. The control member, or multiplexor means, 33 is directed by the DPC to select which input operand becomes operand 2 of adder unit 32. The result provided by adder unit 32 along line 34 represents the rdest value which is coupled to one of the 32 floating-point registers of the processor.

Table 1 illustrates how various encodings of DPC select different data-paths and thereby implement different algorithms. Each value of DPC has a unique set of mnemonics associated with it. Mnemonics PFAM and PFSM correspond to the dual-operation instructions "pipelined floating-point add and multiply" and "pipelined floating-point subtract and multiply", respectively. The actual data-paths realized for the dual-operation instructions given by the mnemonics of Table 1 are shown in FIGS. 3 through FIG. 18.

TABLE 1

| DPC | PFAM Mnemonic | PFSM Mnemonic | M-Unit op1 | M-Unit op2 | A-Unit op1 | A-Unit op2 | T Load | K Load* |
|---|---|---|---|---|---|---|---|---|
| 0000 | r2p1 | r2s1 | KR | src2 | src1 | M result | No | No |
| 0001 | r2pt | r2st | KR | src2 | T | M result | No | Yes |
| 0010 | r2ap1 | r2as1 | KR | src2 | src1 | A result | Yes | No |
| 0011 | r2apt | r2ast | KR | src2 | T | A result | Yes | Yes |
| 0100 | i2p1 | i2s1 | KI | src2 | src1 | M result | No | No |
| 0101 | i2pt | i2st | KI | src2 | T | M result | No | Yes |
| 0110 | i2ap1 | i2as1 | KI | src2 | src1 | A result | Yes | No |
| 0111 | i2apt | i2ast | KI | src2 | T | A result | Yes | Yes |
| 1000 | rat1p2 | rat1s2 | KR | A result | src1 | src2 | Yes | |
| 1001 | m12apm | m12asm | src1 | src2 | A result | M result | No | No |
| 1010 | ra1p2 | ra1s2 | KR | A result | src1 | src2 | No | No |
| 1011 | m12ttpa | m12ttsa | src1 | src2 | T | A result | Yes | No |
| 1100 | iat1p2 | iat1s2 | KI | A result | src1 | src2 | Yes | No |
| 1101 | m12tpm | m12tsm | src1 | src2 | T | M result | No | No |
| 1110 | ia1p2 | ia1s2 | KI | A result | src1 | src2 | No | No |
| 1111 | m12tpa | m12tsa | src1 | src2 | T | A result | No | No |

*If K-load is set, KR is loaded when operand-1 of the multiplier is KR, KI is loaded when operand-1 of the multiplier is KI.

For purposes of illustration, consider an example whereby a programmer wishes to perform a matrix inversion. In the present invention, this is accomplished using the software instruction r2p1, illustrated in the actual data path of FIG. 3. In performing a matrix inversion, the inner loop of the algorithm assumes the mathematical relationship given below:

$$kV_1 + V_2 \rightarrow V_2$$

Where k represents a real number constant, while $V_1$ and $V_2$ are vector elements. Performing a matrix inversion involves multiplying each element of a vector by a certain constant then adding that result to a second vector, whereby the result is stored back into the second vector storage location. To implement this instruction, FIG. 3 shows the KR register coupled directly to the op1 input of the multiplier unit. The other input of the multiplier unit (op2) is coupled to the floating-point instruction operand src2. The output result of the multiplier unit is coupled to the op2 input of the adder unit and the op1 input of the adder unit is coupled to the src1 instruction operand of the floating-point unit. The src1 and src2 operands correspond to $V_2$ and $V_1$ in the above equation. The result from the adder unit is placed in the rdest register where it is then becomes the new value for vector $V_2$.

Matrix inversion provides a good example of a dual-operation involving inner loop constants that can be done with the bus control apparatus of the present invention but cannot be easily performed using the traditional multiply cumulate operation. The multiply cumulate alternative is less desireable because it is generally less accurate, more difficult to program and is slower in producing results. (It should be noted that the traditional multiply cumulate operation is implemented by the m12apn software instruction as applied to the bus matrix of the present invention).

Whereas many alternations and modifications of the present invention will no doubt become apparent to the person of ordinary skill in the art after having read the foregoing description, it is to be understood that the particular embodiment shown and described by way of illustration is in no way intended to be considered limiting. For example, although this disclosure has shown a variety of algorithms that can be implemented, other matrix connections are possible to implement different algorithms. Therefore, reference to the details of the illustrated data path are not intended to limit the scope of the claims which themselves recite only those features regarded as essential to the invention.

Thus, a novel bus control apparatus for performing dual-operation instructions within a floating-point unit of a microprocessor has been described.

I claim:

1. A bus apparatus in a floating-point unit that includes a file of floating point registers for supplying one of a plurality of operands including a first source operand to a first source bus and a second source operand to a second source bus, said file coupled to a result bus, said floating point unit also including a pipelined multiplier having first and second operand inputs for multiplying two operands to produce a multiplier result at a last multiplier stage and a pipelined adder having third and fourth operand inputs for adding two operands to produce an adder result that is supplied to the result bus from a last adder stage, said bus apparatus for implementing algorithms which require simultaneous add and multiply operations, said bus apparatus comprising:
    a first constant holding register having a single input coupled to the first source bus, said first holding register dedicated for storing a constant;
    a temporary holding register having a single input coupled to the last multiplier stage, said second holding register dedicated for storing the multiplier result;
    a plurality of multiplexers including a first multiplexer means for selectively coupling into the first operand input of the pipelined multiplier a first one of a plurality of operands including the first source operand and the constant stored in said first constant holding register, a second multiplexer means for selectively coupling into the second operand input a second one of said plurality of operands including the second source operand and the result operand a third multiplexer means for selectively coupling to said third operand input in said adder means a third one of said plurality of operands including the first source operand, the multiplier result stored in said temporary holding register, and the adder result, and a fourth multiplexer means for selectively coupling to said fourth operand input in said adder means a fourth one of said plurality of operands including the multiplexer result, the adder result, and the second source operand; and
    control means coupled to said first, second, third, and fourth multiplexer means for selecting which of said plurality of operands are said first one, said second one, said third one; and said fourth one of said plurality of operands.

2. The apparatus of claim 1, wherein said constant includes real and imaginary components, and further comprising:
    a second constant holding register having a single input coupled to the first source bus, said second constant holding register dedicated for storing the imaginary component of said constant, so that said first constant holding register stores the real component of said constant; and
    said first multiplexer means also includes means for selectively coupling the output of said second holding register into the first input of the adder.

3. The apparatus of claim 1 wherein said adder result is provided to a destination register within said floating-point register files.

4. An apparatus for facilitating simultaneous operation of a multiplier and an adder of a floating point unit, said apparatus connecting a register file including a plurality of registers with a multistage multiplier and a multistage adder, the multistage multiplier having a first input, a second input, and a multiplier output that outputs a multiplier result after one or more clock cycles, the multistage adder having a first input, a second input, and an adder output that outputs an adder result after one or more clock cycles, said apparatus comprising:
    a first source bus coupled to the register file;
    a second source bus coupled to the register file;
    a result bus coupled to the adder output and the register file;
    a first constant holding register coupled to the first source bus, said register having a single input and a single output;
    a first multiplexer having an output coupled to the first multiplier input, said first multiplexer having inputs including the first source bus and the single output from the first constant holding register;
    a second multiplexer having an output coupled to the second multiplier input, said second multiplexer having inputs including the second source bus and the result bus;
    a third multiplexer having an output coupled to the first adder input, said third multiplexer having inputs including the first source bus and the result bus; and
    a fourth multiplexer having an output coupled to the second adder input, said fourth multiplexer having inputs including the second source bus, the result bus, and the multiplier result.

5. The apparatus as in claim 4, further comprising:
    a second constant holding register coupled to the first source bus for storing an imaginary constant supplied from said first source bus, said second constant holding register having a single output and a single output; and
    wherein the first multiplexer has an additional input coupled to the single output of the second constant holding register.

6. The assembly as in claim 4, further comprising:
    a temporary holding register coupled to the multiplier output for storing the multiplier result; and
    wherein the third multiplexer has an additional input coupled to the temporary holding register.

* * * * *